United States Patent
Fridman et al.

(10) Patent No.: US 9,691,117 B2
(45) Date of Patent: Jun. 27, 2017

(54) EXTERNAL VALIDATION OF GRAPHICS PIPELINES

(75) Inventors: Gil Fridman, Yokneam Elit (IL); Arie Narkis, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 13/994,720

(22) PCT Filed: Nov. 30, 2011
(Under 37 CFR 1.47)

(86) PCT No.: PCT/US2011/062561
§ 371 (c)(1),
(2), (4) Date: Oct. 23, 2014

(87) PCT Pub. No.: WO2013/081593
PCT Pub. Date: Jun. 6, 2013

(65) Prior Publication Data
US 2015/0097846 A1     Apr. 9, 2015

(51) Int. Cl.
| G06T 15/00 | (2011.01) |
| G06T 1/20 | (2006.01) |
| G06T 15/80 | (2011.01) |
| G09G 5/36 | (2006.01) |
| G06F 9/44 | (2006.01) |
| G06F 9/445 | (2006.01) |
| G06F 11/34 | (2006.01) |

(52) U.S. Cl.
CPC ............ *G06T 1/20* (2013.01); *G06F 9/44* (2013.01); *G06F 9/44521* (2013.01); *G06T 15/005* (2013.01); *G06T 15/80* (2013.01); *G09G 5/363* (2013.01); *G06F 11/3466* (2013.01); *G06F 2201/865* (2013.01)

(58) Field of Classification Search
None
See application file for complete search history.

(56) References Cited

U.S. PATENT DOCUMENTS

| 6,603,481 B1 * | 8/2003 | Kawai | G06F 15/8007 345/505 |
| 7,095,416 B1 * | 8/2006 | Johns | A63F 13/10 345/522 |
| 7,750,913 B1 * | 7/2010 | Parenteau | G06F 8/30 345/426 |
| 2007/0091100 A1 | 4/2007 | Brothers | |
| 2009/0027407 A1 * | 1/2009 | Bourd | G06T 15/005 345/522 |

(Continued)

OTHER PUBLICATIONS

Taiwan Office Action issued in corresponding TW application No. 101143669 dated Jan. 7, 2015.

(Continued)

*Primary Examiner* — Joni Richer
(74) *Attorney, Agent, or Firm* — Trop Pruner & Hu, P.C.

(57) ABSTRACT

Data may be streamed out of a graphics pipeline during run time without preprogramming the stream out. A command stream may be captured, draw commands monitored, and shader output definitions may be parsed to determine how to stream out shader data, for example for debugging. Data may be streamed out from an application without using the application's original code.

30 Claims, 3 Drawing Sheets

(56) References Cited

U.S. PATENT DOCUMENTS

| | | | |
|---|---|---|---|
| 2009/0254883 A1* | 10/2009 | Munson | G06F 11/3624 |
| | | | 717/124 |
| 2011/0043518 A1 | 2/2011 | Von Borries | |
| 2011/0084977 A1* | 4/2011 | Duluk, Jr. | G06T 1/60 |
| | | | 345/522 |
| 2011/0234592 A1 | 9/2011 | Patel | |

OTHER PUBLICATIONS

PCT International Search Report and Written Opinion issued in corresponding PCT/US2011/062561 dated Aug. 22, 2012, (9 pages).

Sharif, A., et al., "Total Recall: A Debugging Framework for GPUs", Proceeding, GH '08 Proceedings of the 23rd ACM SIGGRAPH/Eurographics Symposium on Graphics Hardware, (8 pages), Jun. 2008.

* cited by examiner

EXTERNAL VALIDATION OF GRAPHICS PIPELINES

BACKGROUND

This relates generally to computers and, particularly, to graphics processing.

Graphics processors may use a pipeline that implements a process to convert vertices, textures, buffers, and states into images on a display screen. When a developer wants to debug or modify an existing program, the options for accessing the output from the pipeline are limited.

There is a stream output capability in DirectX graphics pipelines, but this stream output capability must be coded in the original application. A debugger with no access to the original source code cannot use this approach.

DETAILED DESCRIPTION

Figure 1:
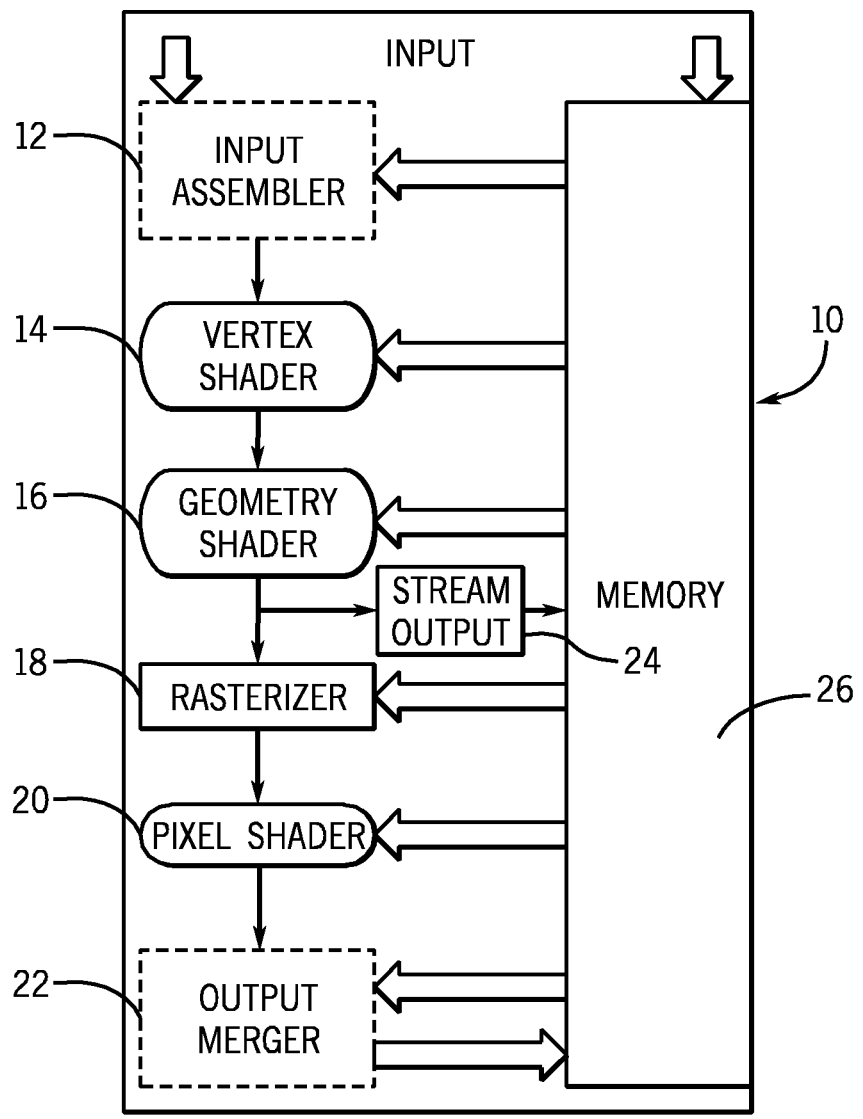
FIG. 1 is a depiction of a graphics pipeline in accordance with one embodiment.

Referring to FIG. 1, a graphics pipeline 10, such as that commonly used in Microsoft DirectX application program interface (API), receives inputs to an input assembler 12. Microsoft DirectX is a collection of API's for handling multimedia tasks, including video and games. The input assembler reads in vertex data from an application supplied vertex buffer and feeds the vertex data to the rest of the pipeline. The vertex shader 14 performs operations, one vertex at a time, including operations such as transformation, skinning, or lighting. The geometry shader 16 processes primitives, such as triangles, points, or lines.

The stream output 24 writes out the previous stage's results to memory. It is also useful in recirculating data back into the pipeline. While it is an existing feature that exists within the graphics pipeline, the stream output can only be operated by the original code that was written for the graphics application. In accordance with some embodiments of the present invention, the stream output may be manipulated by an external programmer without accessing the source code.

The geometry shader output is provided to a rasterizer 18 that converts primitives into pixels and feeds those pixels into the pixel shader 20. The pixel shader 20 determines the pixel color to be written to a render target and can also calculate a depth value to be written to a depth buffer. The pixel shader output is provided to the output merger 22 that merges output data to build the final result. The memory 26 may be a frame buffer or other buffers or textures, to mention a few examples.

In accordance with some embodiments, a geometry extractor extracts DirectX geometry pipeline data by actually breaking up the DirectX pipeline at the middle using the stream output 24. The steam output 24 is called transform feedback in OpenGL. Stream output is used herein for DirectX stream output and OpenGL transform feedback. Geometry data is externally forced through the stream output 24. This is done externally and at run time by altering the stream output commands. "Externally" streaming out data means to stream out data from an application without using the application's original code. The geometry extractor adds its own stream out declaration to the stream out stage, forcing all geometry type data to be streamed out. After each draw operation, the geometry extractor accesses the streamed out data and exports it to a user.

Figure 2:
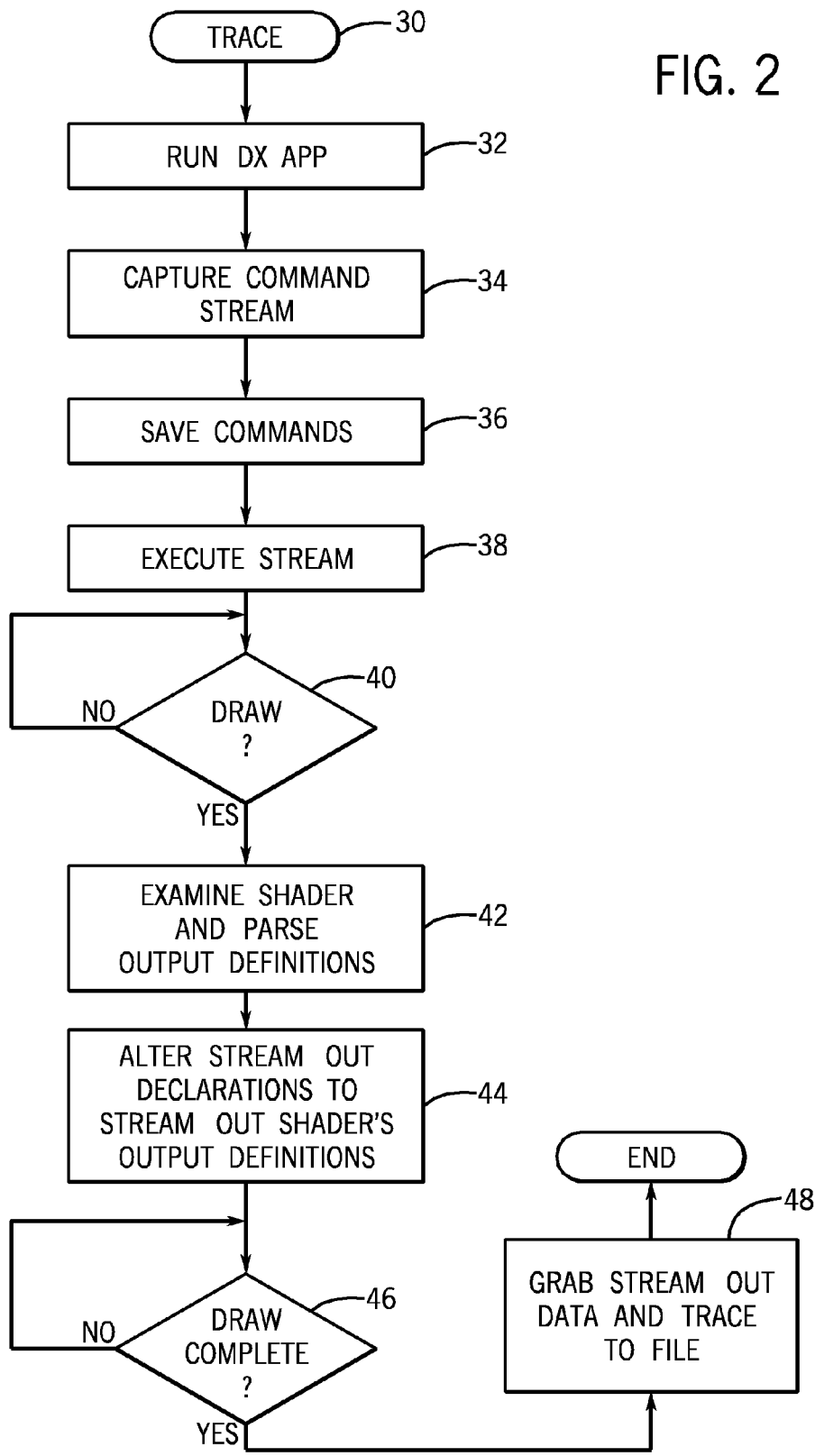
FIG. 2 is a flow chart for one embodiment.

Referring to FIG. 2, the sequence 30 may be implemented in software, firmware, and/or hardware. In software and firmware embodiments, the sequence may be implemented by computer executed instructions stored on a non-transitory computer readable medium, such as an optical, magnetic, or semiconductor storage.

The sequence begins by running the graphics pipeline application. In one embodiment, the application is a Microsoft DirectX application, as indicated in block 32. The application may also be an OpenGL application. The application is one that a debugger or analyst wants to analyze or validate. A stream of commands, such as DirectX or OpenGL commands are captured, as indicated in block 34. These commands are saved and executed, as indicated in blocks 36 and 38.

During the stream execution, the sequence monitors to the relevant DirectX application program interface calls, such as SetXShader( ), and draw calls. Just before a draw call is about to be executed, as determined in diamond 40, the last geometry or pipe shader is examined and its output definitions are parsed out (block 42).

The application stream out declarations are altered to stream out the last geometry pipe shader output definitions, as indicated at block 44. The stream out definitions are contained in a stream output object that is a template object that streams data out of the geometry-shader stage.

The syntax that is used is as follows:

in out StreamOutputObject<DataType>Name; The stream-output object types include PointStream, which is the sequence of point primitives, LineStream, which is the sequence of line primitives, and TriangleStream, which is the sequence of triangle primitives. The DataType is the output data type and can be any High Level Shader Language (HLSL) data type surrounded by angled brackets. The Name is a variable name in the form of an American Standard Code for Information Interchange (ASCII) string that uniquely identifies the object.

Once the operations shown in blocks 42 and 44 have been completed, a check at diamond 46 determines whether the draw command has been executed. If so, the stream out data is grabbed and it is traced to the file, as indicated in block 48. A standard DirectX SO_STATISTICS query may be used to determine the amount of data that has been streamed out.

Figure 3:
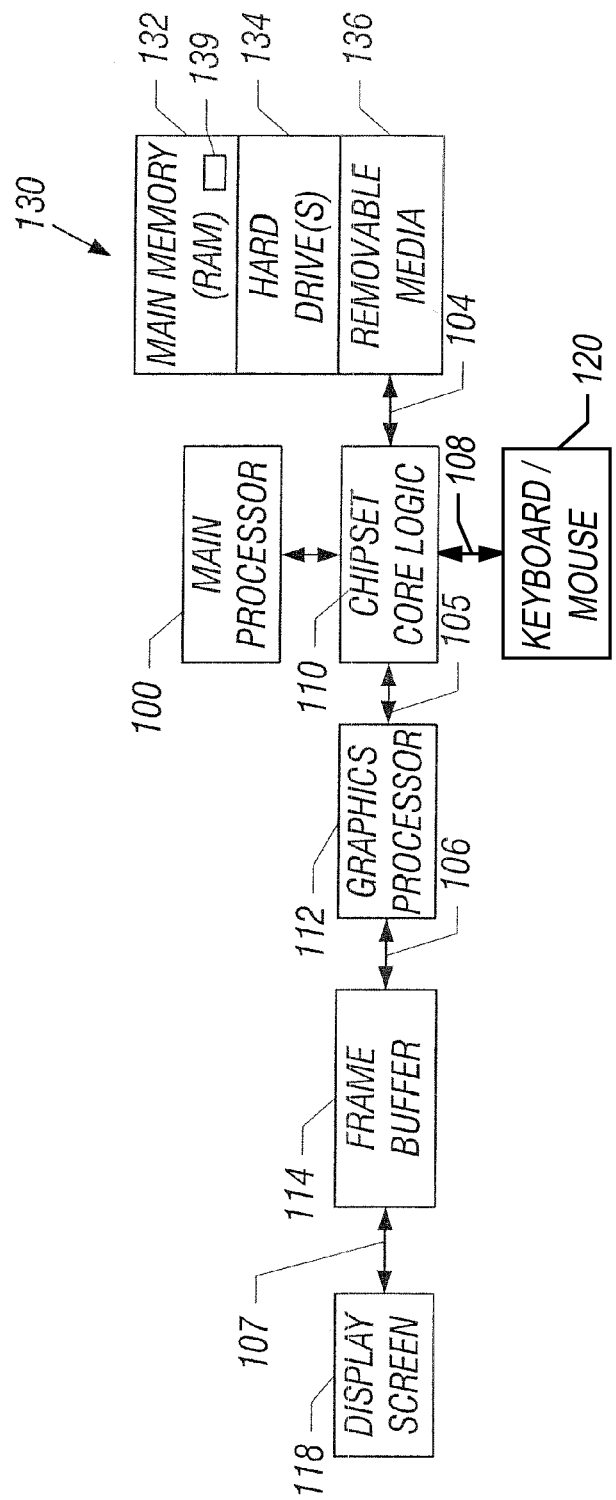
FIG. 3 is a schematic depiction for one embodiment.

The computer system 130, shown in FIG. 3, may include a hard drive 134 and a removable medium 136, coupled by a bus 104 to a chipset core logic 110. The computer system may be any computer system, including a smart mobile device, such as a smart phone, tablet, or a mobile Internet device. A keyboard and mouse 120, or other conventional components, may be coupled to the chipset core logic via bus 108. The core logic may couple to the graphics processor 112, via a bus 105, and the central processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 (as indicated at 139) or any available memory within the graphics processor. Thus, in one embodiment, the code to perform the sequences of FIG. 2 may be stored in a non-transitory machine or computer readable medium 130, such as the memory 132, and/or the graphics processor 112, and/or the central processor 100 and may be executed by the processor 100 and/or the graphics processor 112 in one embodiment.

FIG. 2 is a flow chart. In some embodiments, the sequences depicted in these flow charts may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 2.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   streaming out data from a graphics pipeline at run time by streaming out data from an application without using the application's original code by forcing geometry data out through a stream output that writes out a previous stage's results to memory; and
   using a geometry extractor that adds its own stream out declaration to the stream output.

2. The method of claim 1 including capturing a command stream from the pipeline.

3. The method of claim 1 including saving parts of a captured command stream.

4. The method of claim 3 including detecting draw commands.

5. The method of claim 4 including, before executing a draw command, parsing shader output definitions.

6. The method of claim 5 including altering stream output declarations to stream out shader output definitions.

7. The method of claim 6 including resolving a current state of the graphics pipeline.

8. The method of claim 6 including determining if a draw command has executed.

9. The method of claim 8 including streaming out data from a shader after the draw command executes.

10. The method of claim 9 including using a SO_STATISTICS query to trace output size.

11. A non-transitory computer readable medium storing instructions to enable a computer to:
    stream out data from a graphics pipeline at run time by streaming out data from an application without using the application's original code by forcing geometry data out through a stream output that writes out a previous stage's results to memory; and
    using a geometry extractor that adds its own stream out declaration to the stream output.

12. The medium of claim 11 further storing instructions to capture a command stream from the pipeline.

13. The medium of claim 11 further storing instructions to save parts of a captured command stream.

14. The medium of claim 13 further storing instructions to detect draw commands.

15. The medium of claim 14 further storing instructions to, before executing a draw command, parse shader output definitions.

16. The medium of claim 15 further storing instructions to alter stream output declarations to stream out shader output definitions.

17. The medium of claim 16 further storing instructions to resolve a current state of the graphics pipeline.

18. The medium of claim 16 further storing instructions to determine if a draw command has executed.

19. The medium of claim 18 further storing instructions to stream out data from a shader after the draw command executes.

20. The medium of claim 19 further storing instructions to use a SO_STATISTICS query to trace output size.

21. An apparatus comprising:
    a graphics pipeline;
    a memory coupled to said pipeline;
    a stream output coupled to said pipeline; and
    a processor streaming out data from the graphics pipeline at run time by streaming out data from an application without using the application's original code, by forcing geometry data out through a stream output that writes out a previous stage's results to memory, and using a geometry extractor that adds its own stream out declaration to the stream output stage.

22. The apparatus of claim 21, the processor to capture a command stream from the pipeline.

23. The apparatus of claim 21, the processor to save parts of a captured command stream.

24. The apparatus of claim 23, the processor to detect draw commands.

25. The apparatus of claim 24, the processor to, before executing a draw command, parse shader output definitions.

26. The apparatus of claim 25, the processor to alter stream output declarations to stream out shader output definitions.

27. The apparatus of claim 26, the processor to resolve a current state of the graphics pipeline.

28. The apparatus of claim 26, the processor to determine if a draw command has executed.

29. The apparatus of claim 28, the processor to stream out data from a shader after the draw command executes.

30. The apparatus of claim 29, the processor to use a SO_STATISTICS query to trace output size.

* * * * *